May 23, 1972 W. E. HUBER 3,664,715
ENDLESS TRACK
Filed July 3, 1970 2 Sheets-Sheet 2
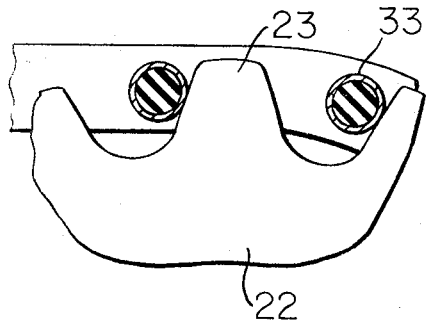
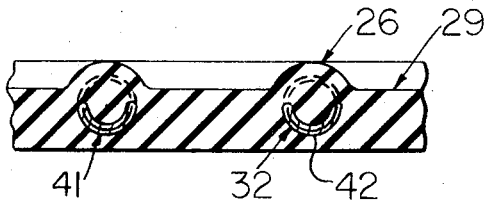
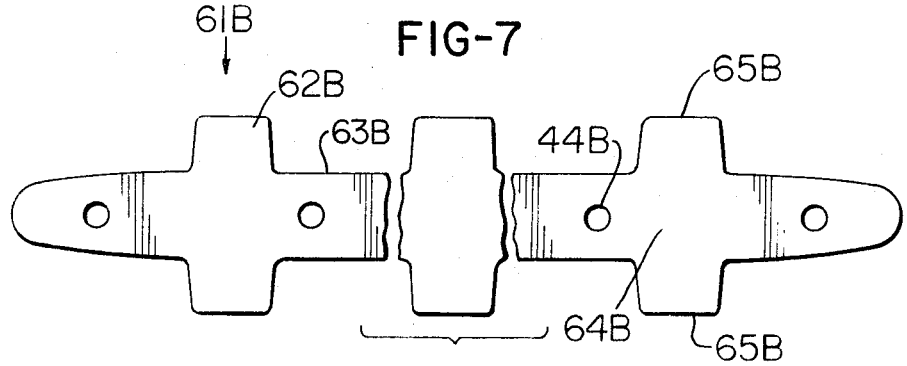
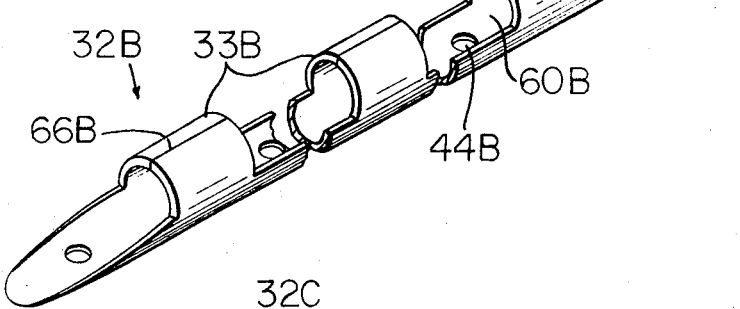
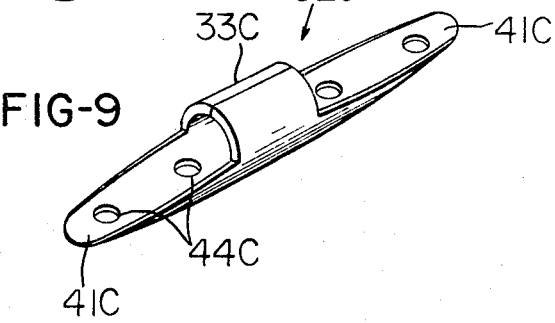
INVENTOR.
WALTER E. HUBER
BY Reuben Wolk
ATTORNEY

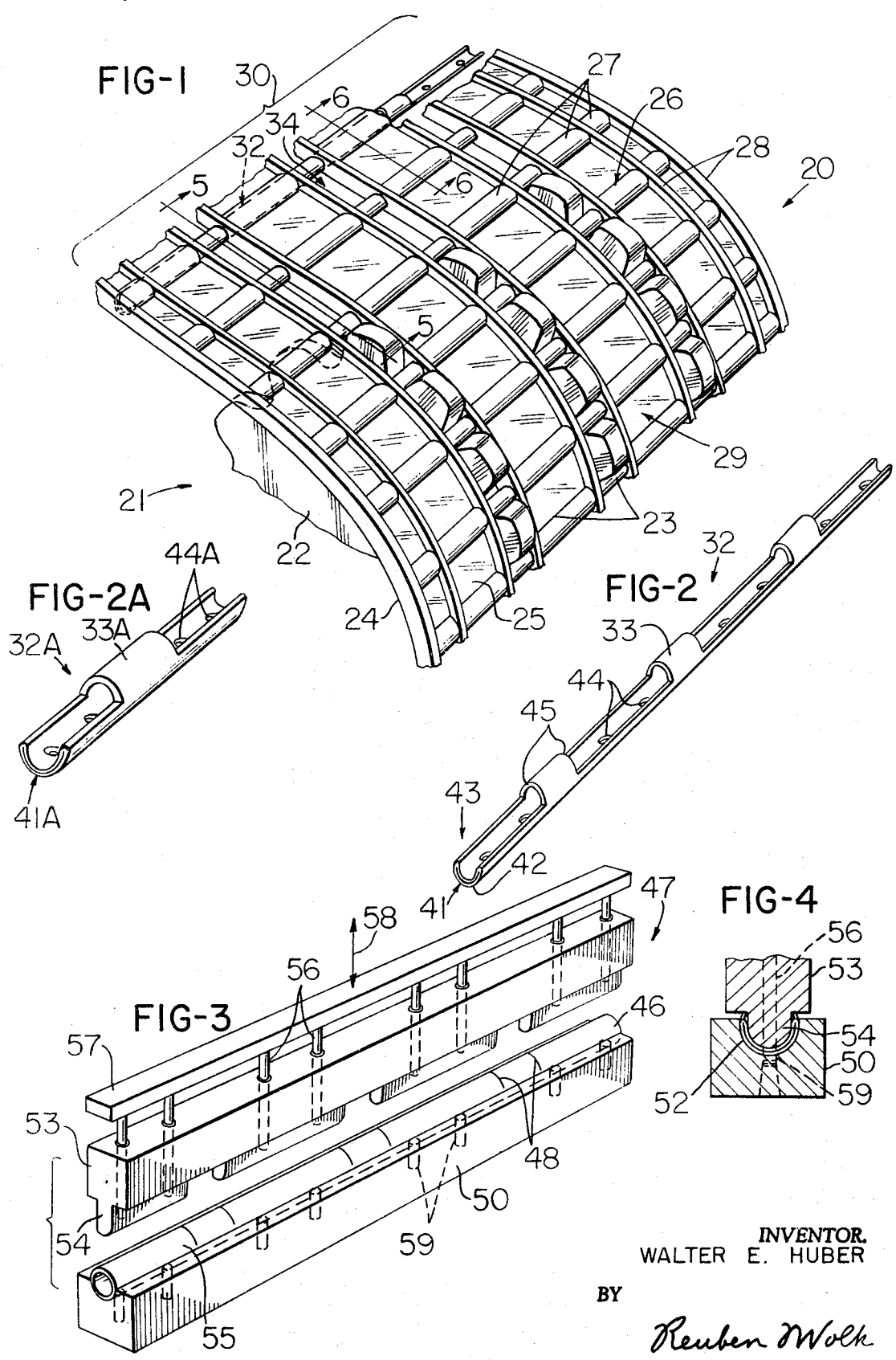

United States Patent Office 3,664,715
Patented May 23, 1972

3,664,715
ENDLESS TRACK
Walter E. Huber, Springfield, Mo., assignor to Dayco Corporation, Dayton, Ohio
Filed July 9, 1970, Ser. No. 53,607
Int. Cl. B62d 55/24
U.S. Cl. 305—38
8 Claims

ABSTRACT OF THE DISCLOSURE

An endless track of substantially uniform width is provided which is particularly adapted for use on motor driven vehicles such as snowmobiles, or the like, and such track has a plurality of reinforcing members embedded therein in equally spaced apart relation along the endless path of such track and each member has at least one exposed cylindrical portion extending therealong. A pair of openings extends through the track on opposite sides of each cylindrical portion with each pair of openings being adapted to receive an associated pair of teeth of a drive sprocket for the track therethrough enabling the track to be driven by direct engagement of sprocket teeth against the outside surfaces of the cylindrical portions and the openings are constructed to allow unobstructed engagement and disengagement by the drive sprocket teeth. Improved reinforcing members for such a track are also provided together with an apparatus for and method of making such members.

BACKGROUND OF THE INVENTION

Endless traction belts or tracks of the type used on snowmobiles, tractors, and the like, generally have substantially uniform widths and it has been found desirable to provide lateral reinforcement for the cleats or traction members usually extending transverse the longitudinal or endless path of each of such tracks. Reinforcing rods have been used heretofore; however, such rods are comparatively expensive and are difficult to hold in position. Further, the endless tracks or traction belts using previously proposed reinforcing rods are deficient in that the sprocket receiving openings provided in such belts do not expose the lateral reinforcing rods to enable driving such belts in a positive manner whereby the sprocket teeth of an associated driving sprocket usually cause substantial wear and damage to the previously proposed traction belts reducing the effectiveness of driving engagement and thus substantially reducing the operating life of such belts.

SUMMARY

This invention provides an improved endless track of simple and economical construction which uses improved lateral reinforcing members which provide optimum lateral stability yet maintain circumferential flexibility and each reinforcing member extends completely across the width of the track and has at least one exposed cylindrical portion along its length. The track has a pair of openings extending through the track on opposite sides of each cylindrical portion with each pair of openings being adapted to receive an assocaited pair of teeth of a drive sprocket for the track therethrough enabling the track to be driven by direct engagement of sprocket teeth against the outside surfaces of the cylindrical portions and the openings are constructed to allow unobstructed engagement and disengagement by the drive sprocket teeth. This invention also provides an apparatus for and method of making improved reinforcing members particularly adapted for use in a track of the character mentioned.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a perspective view with parts broken away particularly illustrating one exemplary embodiment of an improved traction belt or track of this invention and a sprocket wheel assembly, having a plurality of three equally spaced sprockets, which is used to drive such track;

FIG. 2 is a perspective view of a typical reinforcing member comprising the track of FIG. 1 and such member has a plurality of cylindrical tubular portions provided therealong;

FIG. 2A illustrates a reinforcing member which is similar to the member of FIG. 2 and the member of FIG. 2A has only one cylindrical tubular portion provided therealong whereby such member is particularly adapted to be used in a track which is driven by a single central driving sprocket;

FIG. 3 is a perspective view with parts broken away illustrating an exemplary apparatus and method which may be used to form the reinforcing member of FIG. 2;

FIG. 4 is a fragmentary cross-sectional view taken through the apparatus of FIG. 3, with the cooperating members of such apparatus in a closed position;

FIG. 5 is a fragmentary view taken essentially on the line 5—5 of FIG. 1;

FIG. 6 is a fragmentary cross-sectional view taken essentially on the line 6—6 of FIG. 1;

FIG. 7 is a plan view parts broken away of an exemplary flat blank used to make another embodiment of a reinforcing member which may be used in the track of FIG. 1;

FIG. 8 is a perspective view with parts broken away of a reinforcing member made using the blank of FIG. 7; and FIG. 9 is a perspective view illustrating a reinforcing member which is also made from a flat metal blank and which may be used in a track which is driven by a single central drive sprocket.

DESCRIPTION OF ILLUSTRATED EMBODIMENTS

Reference is now made to FIG. 1 of the drawings which illustrates an exemplary endless traction belt, hereinafter referred to as an endless track, of this invention which is designated generally by the reference numeral 20 and the track 20 is of the type particularly adapted to be used on a motor driven vehicle such as a snowmobile, or the like, having a driving sprocket assembly 21 which includes a plurality of three identical sprocket wheels 22, each having a plurality of circumferentially equally spaced apart driving teeth 23 of known construction. The belt 20 may be made of any suitable materials and has the major portion thereof made of an elastomeric material such as natural or synthetic rubber, polyurethane, or the like, and such major portion may include one or more layers of reinforcing fabric suitably embedded in position using any technique known in the art.

The track 20 has a substantially smooth inside or sprocket engaging surface 24 and a ground engaging surface 25 which comprises a plurality of equally spaced apart parallel cleats which in this example are comprised of a plurality of aligned sections 27 separated by parallel ribs 28 which extend longitudinally along the endless path.

As seen in FIG. 6, the track 20 has a major portion 29 which is of substantially uniform thickness throughout and each cleat 26 has a substantially semicircular cross-sectional configuration and extends outwardly of the major surface portion 29. Further, each cleat 26 extends across substantially the full width 30 of the track as shown in FIG. 1.

The track 20 has a plurality of identical reinforcing members, each designated by the reference numeral 32, and the reinforcing members are embedded in the track 20 in equally spaced parallel relation along the endless path and each member extends substantially centrally through an associated cleat 26. Each member 32 also extends substantially completely across the width 30 of the track and has at least one cylindrical portion 33 provided therein. In the illustration of FIGS. 1 and 2, each member 32 has a plurality of three cylindrical tubular portions 33 provided as an integral part thereof with each tubular portion having a right circular cylindrical outline.

The track 20 has a plurality of identical openings 34 provided therein and a pair of openings 34 are arranged on opposite sides of each cylindrical portion 33 of each member 32, with the member embedded in position within the track 20 so that each pair of openings are adapted to receive a pair of teeth 23 of a drive sprocket 22 therethrough. Each opening 34 is formed in the track 20 so that each right circular cylindrical portion 33 is exposed for easy engagement by associated teeth 23 without the likelihood of damaging the elastomeric material comprising the track and defining the outline of each opening 34. In particular, it will be seen that each tooth 23 is received within an associated opening 34 in a free and unobstructed manner to enable each tooth 23 to directly engage and disengage its associated portion 33 with comparative ease. The track 20 may be made by any suitable molding technique known in the art so that the inside of each tubular portion 33 is filled with elastomeric material, see FIG. 5, while having the outside right circular cylindrical surface of portion 33 exposed. By filling the inside of each tubular portion 33 with elastomeric material the structural strength thereof is substantially increased while keeping the amount of the material used to make each member 32 at a minimum.

Each member 32 has an integral double layer portion 41 of roughly semicircular cross-sectional outline adjoining each side of each tubular portion 33 and each double layer portion 41 provides added strength and rigidity for the member 32. Each member 32, including its integral double layer portions, is preferably made from any suitable material, such as a metallic material, and each double layer portion 41 comprises an outwardly concave, i.e., concave outwardly toward the ground engaging surface and as seen in FIGS. 1 and 6, semicylindrical layer 42 having an originally outwardly convex diametrically arranged semicylindrical layer which is now collapsed inwardly against the outwardly concave layer 42 to define a layer designated by the reference numeral 43.

Each member 32 has at least one opening extending through each double thickness portion 41 thereof and in this example of the invention each double thickness portion 41 has a plurality of openings 44 extending therethrough; and, with each member 32 being embedded in the track 20, elastomeric material extends through each opening 44 and helps hold the member firmly in position against movement relative to the elastomeric material. Each member 32 also has oppositely arranged edge portions 45 defining opposite side edges of each tubular portion 33 which engage associated ribs 28 and also help hold the associated member 32 in position to prevent axial movement thereof.

Each member 32 may be made using any suitable apparatus or method, and from any suitable material. However, each member 32 is preferably made from a metal tube blank or tube 46 and an exemplary apparatus and method for making such member is shown in FIG. 3 and designated generally by the reference numeral 47.

Each tube 46 is provided with a plurality of transverse cuts 48, each defining an associated edge 45 of a tubular portion 33. The tube 46 with cuts 48 provided therein is placed within a lower member 50 of the apparatus or die assembly 47 and member 50 has an upwardly concave surface 52, see FIG. 4, which receives the lower surface of the tube 46 therein. An upper die member or die 53 is provided and has a plurality of projections 54 provided therein which are of predetermined axial length and are particularly adapted to engage upwardly convex semicylindrical portions 55 of the blank 46. The upper die 53 is urged toward the lower die 50, causing inward collapsing movement of the portions 55 essentially as illustrated in FIG. 4 to define the layer 43 of the double layer or double thickness portion 41.

The upper die 53 may also be provided with a plurality of punching tool members 56 which are vertically movable with and relative to the die 53 and are suitably interconnected to a common structure 57. Once the tube portions 55 have been collapsed in the manner illustrated in FIG. 4, the punching members 56 are moved by any suitable actuator, indicated by a double arrow 58, to punch the double layer portions 41 and define openings 44 in each double layer portion.

A plurality of cooperating openings 59 are provided in the lower die member 50 for receiving the punching members 56; and, one or more knockout pins, not shown, may also extend upwardly through the openings 59 (once the upper punch 53 is moved away from the formed reinforcing member 32) to remove the member 32 from within the upwardly concave surface or die cavity 52.

Although actuating means has not been shown for relatively moving the dies 50 and 53 of the apparatus 47 toward and away from each other, it will be appreciated that any suitable actuating means may be provided for these dies. Further, dies 50 and 53 may be provided as an integral part of or fixed to oppositely arranged platens of a standard press and suitably actuated using known techniques to form the reinforcing members 32 as well as punch holes 44 therein in the manner previously described.

Each reinforcing member 32 comprising the track 20 is shown as having a plurality of three tubular portions 33 which are adapted to be engaged by associated teeth of three sprocket wheels 22 of a drive sprocket assembly 21; however, it will be appreciated that a track similar to the track 20 may be driven by only a central drive sprocket such as the central sprocket 22 of the assembly 21 and such centrally driven track would use a plurality of reinforcing members each made essentially as shown in FIG. 2A.

Because of the similarity of the member of FIG. 2A to the reinforcing member 32, such member will be designated generally by the reference numeral 32A, its tubular portion by the reference numeral 33A, each double thickness portion by the reference numeral 41A, and the openings in the double thickness portions by the reference numeral 44A and these components are used for similar purposes as previously described in connection with the member 32. Therefore, a detailed description of the member 32A and the manner of using member 32A in an associated track 20 is considered unnecessary.

Another exemplary embodiment of a reinforcing member is shown in FIG. 8 and such member may be used interchangeably with the member 32 in the track 20 of FIG. 1. The reinforcing member of FIG. 8 is very similar to the reinforcing member 32; therefore, such reinforcing member will be designated generally by the reference numeral 32B and parts of the member 32B which are very similar to corresponding parts of the member 32 will be designated by the same reference numeral as in the member 32, followed by the letter designation B and not described again. Only those component parts which are substantially different from corresponding parts of the member 32 will be designated by a new reference numeral also followed by the letter designation B and described in detail.

The member 32B also has a plurality of three tubular portions 33B provided as an integral part thereof and has an integral single layer portion 60B adjoining each side of each tubular portion 33B. Each single layer portion 60B has at least one opening extending therethrough and each opening in each single layer portion is designated by the reference numeral 44B.

The member 32B is made in a simple and economical manner from a flat blank which is suitably cut, as by punching or stamping, for example, from a flat sheet of metallic material (such as sheet steel) and such blank is designated generally by the reference numeral 61B, see FIG. 7. The blank 61B has a plurality of extensions 62B extending beyond opposite side edges 63B thereof and the extensions 62B are provided in cooperating pairs. Each pair of extensions is adapted to be formed to define a substantially semicylindrical configuration while simultaneously forming the main central portion 64B of the blank 61B so that opposite edges 65B of associated extensions 62B are placed in abutting relation as shown at 66B in FIG. 8 to define an associated right circular cylindrical tubular portion 33B. The member 32B may be used in the track 20 in lieu of the member 32 and embedded in position in the elastomeric material comprising such track in a similar manner as previously described for each member 32.

It will also be appreciated that a comparatively short reinforcing member made from a flat blank may also be provided in those applications where it is desired to provide a track similar to the track 20 which is driven by a center sprocket wheel only and such a reinforcing member is shown in FIG. 9 of the drawings and designated by the reference numeral 32C. The member 32C may be used interchangeably with the member 32A in an associated track and has a single tubular portion 33C of right circular cylindrical outer configuration and has a pair of single layer portions 41C adjoining opposite side edges of the tubular portion 33C, with each portion 41C having openings 44C extending therethrough.

In the blank 61B shown in FIG. 7, it will be seen that the openings 44B have been provided therein prior to forming thereof; however, it will be appreciated that the openings 44B may be made after forming the blank 61B and in a similar manner as described in connection with reinforcing members 32.

Each reinforcing member such as reinforcing member 32, for example, is preferably embedded within its track 20 so that with the ground engaging surface in contact with the ground the open areas of each member face outwardly, i.e., the double thickness portions 41 are arranged remote from the ground engaging surface 25, see FIG. 6 of the drawings. It has been found that with the reinforcing elements 32 molded in position in this manner the track has the greatest amount of transverse strength and rigidity yet has flexibility for easy movement in its endless path.

In the above presentation of this invention each reinforcing member has at least one exposed cylindrical tubular portion which is engaged and driven directly by the teeth of an associated sprocket wheel; however, it will be appreciated that it may be desirable to provide a tubular sleeve made of an elastomeric material around each cylindrical portion to provide a cushioning effect and reduce wear of each cylindrical portion. Such an elastomeric sleeve may be molded in position against its associated cylindrical portion during the process of molding the entire track or such sleeve may be slid in position and isolated from elastomeric material used to make the remainder of the track during the molding thereof. Nevertheless, regardless of how such a sleeve is provided, it would help provide operation with minimum noise.

Each of the reinforcing members discussed above is used in track applications where either a single drive sprocket or three drive sprockets are used to drive the associated track. However, the techniques and apparatus used to make members 32 and 32B, for example, may be used to make similar members which have only two cylindrical tubular portions for use in tracks to be driven by only a pair of associated drive sprockets.

While present exemplary embodiments of this invention, and methods of practicing the same, have been illustrated and described, it will be recognized that this invention may be otherwise variously embodied and practiced within the scope of the following claims.

What is claimed is:

1. An endless track having a substantially uniform width and adapted to be moved in an endless path, the major portion of said track composed of an elastomeric material and comprising a ground-engaging surface and a plurality of equally spaced parallel cleats projecting outwardly therefrom along said endless path, reinforcing members extending through said cleats and partially embedded in and extending completely across the width of said track, each of said members having a cylindrical tubular portion which has an exposed outer surface with the tubular portion filled with elastomeric material to increase the structural strength thereof, and a plurality of openings extending through said track on opposite sides of each cylindrical portion and being adapted to receive associated teeth of a drive sprocket for said track, said openings being formed to enable the track to be driven by direct engagement of sprocket teeth against the exposed outer surfaces of the cylindrical portions.

2. A track as set forth in claim 1 in which the outside surface of each cylindrical portion has a right circular cylindrical configuration.

3. A track as set forth in claim 1 in which each of said members has an integral single layer portion of roughly semicircular cross-sectional outline adjoining each side of said cylindrical portion, said adjoining single layer portions holding said cylindrical portion firmly in position.

4. A track as set forth in claim 3 in which each of said members has an opening extending through each single layer portion thereof, each of said openings having elastomeric material extending therethrough which helps hold its associated member in position.

5. A track as set forth in claim 3 in which each of said members is made from a flat sheet of metallic material having a central body portion and a pair of cooperating extensions extending from opposite side edges thereof said extensions being formed together with an associated part of said central body portion to define said cylindrical portion.

6. A track as set forth in claim 1 in which each of said members has an integral double layer portion of roughly semicircular cross-sectional outline adjoining each side of said cylindrical portion and providing added strength and rigidity therefor.

7. A track as set forth in claim 6 in which each double layer portion comprises an outwardly concave semicylindrical layer having an originally outwardly convex diametrically arranged semicylindrical layer collapsed inwardly against the inside surface of said first-named outwardly concave layer.

8. A track as set forth in claim 6 in which each of said members has an opening extending through each double layer portion thereof, each of said openings having elastomeric material extending therethrough which helps hold said member in position in said track.

References Cited

UNITED STATES PATENTS

| | | | |
|---|---|---|---|
| 3,477,767 | 11/1969 | McNeil | 305—38 |
| 2,514,429 | 7/1950 | Waugh | 305—38 |
| 2,899,242 | 8/1959 | Bombardier | 305—38 |

OTHER REFERENCES

German printed application, Scholtz, July 1969.

RICHARD J. JOHNSON, Primary Examiner

U.S. Cl. X.R.

72—324